United States Patent [19]

Nieminen

[11] Patent Number: 5,165,236
[45] Date of Patent: Nov. 24, 1992

[54] DETECTION OF PARTICLES IN A HOT GAS FLOW UPSTREAM OF A GAS TURBINE

[75] Inventor: Jorma J. Nieminen, Varkaus, Finland

[73] Assignee: A. Ahlstrom Corporation, Karhula, Finland

[21] Appl. No.: 608,814

[22] Filed: Nov. 5, 1990

[51] Int. Cl.⁵ .............................. F02C 3/26; F02G 1/00
[52] U.S. Cl. .................................................. 60/39.464
[58] Field of Search .................. 55/459.1, 316, 345; 60/39.464

[56] References Cited

U.S. PATENT DOCUMENTS

| | | | |
|---|---|---|---|
| 4,304,492 | 12/1981 | Fox | 356/439 |
| 4,531,402 | 7/1985 | Reif et al. | 55/270 |
| 4,568,365 | 2/1986 | Metcalfe et al. | 55/462 |
| 4,838,209 | 6/1989 | Hjalmarsson | 60/39.464 |
| 4,852,346 | 8/1989 | Granqvist et al. | 60/39.464 |
| 4,865,629 | 9/1989 | Zievers et al. | 55/345 |
| 4,956,091 | 9/1990 | Van Den Akker | 55/345 |

FOREIGN PATENT DOCUMENTS 3144675 5/1983 Fed. Rep. of Germany .
0150429 6/1988 Japan .
2057060 3/1981 United Kingdom .

Primary Examiner—Richard A. Bertsch
Assistant Examiner—Howard R. Richman
Attorney, Agent, or Firm—Nixon & Vanderhye

[57] ABSTRACT

A gas turbine, or like device which utilizes gas and is susceptible to damage from particles greater than a predetermined size in the gas stream, is protected by providing a cyclone downstream of a particle separator. If any particles are in the gas flow downstream of the particle separator—an aberrant condition—the cyclone will remove them and pass them to a particle trap, from which the particles flow to a measuring device. If the measuring device detects a significant number of particles, then an alarm is sounded or corrective action taken. The cyclone may be a horizontal cyclone, or a flow through cyclone.

10 Claims, 2 Drawing Sheets

DETECTION OF PARTICLES IN A HOT GAS FLOW UPSTREAM OF A GAS TURBINE

BACKGROUND AND SUMMARY OF THE INVENTION

There are many situations in which it is important to be able to accurately detect particles above a predetermined size in a gas stream since a gas utilization device downstream of the detector will be damaged if encountered by a gas stream with particles. One particularly illustrative example of this is a gas turbine which utilizes hot combustion gases in order to do the mechanical work, generate electricity, or the like.

Gas turbines are particularly sensitive to particles in the hot combustion gas stream. Even a small number of particles over 10 micrometers in size will quickly damage a turbine blade, which not only requires replacement of the blade, but can shut down an entire facility for a significant period of time. For that reason, a wide variety of different particle separators have been devised, such as filters, centrifugal separators, and the like, which remove the particles before they get to the turbine. If the particle separator breaks down or is damaged, however, or a sudden change in the fuel causes differences in the particle load, potentially damaging particles can move past the particle separator, which will damage the turbine.

No known systems are in existence which will reliably determine the change in the quality of the stream of gases from a combustion facility to the turbine downstream of the particle separator. Conventional particle detecting or measuring devices typically are not capable of detecting small amounts of fine particles in large flows of gas, such as exist downstream of the particle separators in the flow of hot combustion gases to a turbine. Conventional detection systems may cause false alarms, or simply inadequately determine when potentially damaging particles (e.g. with a size greater than about 10 micrometers) flow in a post-particle separator gas stream.

According to the present invention, it is possible to adequately detect—and then take appropriate corrective action—when particles larger than a predetermined size are passing in a post-particle separator stream to a gas utilization device, such as a gas turbine. This is accomplished, according to the invention, by providing a particle concentrating means disposed between the particle separator and the gas utilization device, and providing a particle detecting means associated with the particle concentrating means. In response to the particle detecting means, an activity will be initiated which prevents damage to the gas utilization device, such as activating an alarm whereby an operator takes corrective action, putting an alternative/substitute particle separator on line, shutting down the combustor, etc.

According to one aspect of the present invention, upstream of a device for using gases—such as a turbine—a particle removing means removes particles greater than a predetermined size. The particle concentrating means is disposed between the turbine and the particle remover, and a particle detector is associated with the concentrating means. An alarm, or the like, responsive to the particle detecting means initiates activity which prevents damage to the turbine when an undesirable level of particles is detected. The particle concentrating means comprises a cyclone, such as a horizontal cyclone or a flow through cyclone. The particle detecting means may be a gas trap disposed in the particle discharge from the cyclone, and a detecting chamber operatively connected to the gas trap.

According to the method of the present invention, damage to a device for utilizing gases that is easily damaged by particles of greater than a predetermined size is prevented. The method comprises the steps of essentially sequentially: (a) Effecting removal of particles greater than the predetermined size from a gas stream. (b) Concentrating any particles greater than the predetermined size remaining in the gas stream by subjecting the gas stream to cyclonic action. (c) Detecting the level of concentrated particles greater than the predetermined size; and (d) in response to step (c) initiating activities that prevent damage to the gas utilization device.

According to another aspect of the invention, an assembly for creating and using hot combustion gases is provided. The assembly comprises: Means for combusting fuel to produce hot combustion gases having particles therein. Means for removing particles greater than a predetermined size from the hot combustion gases. A conduit extending from the particle removing means. A turbine operatively connected to the conduit. A cyclone disposed in the conduit between the particles removing means and the turbine. A particle discharge from the cyclone. A particle trap disposed in the particle discharge. And, particle detecting means operatively associated with the particle trap.

It is the primary object of the present invention to provide for the effective protection of a gas turbine or like device readily damaged by particles in a gas flow. This and other objects of the invention will become clear from an inspection of the detailed description of the invention and from the appended claims.

DETAILED DESCRIPTION OF THE DRAWINGS

Figure 1:
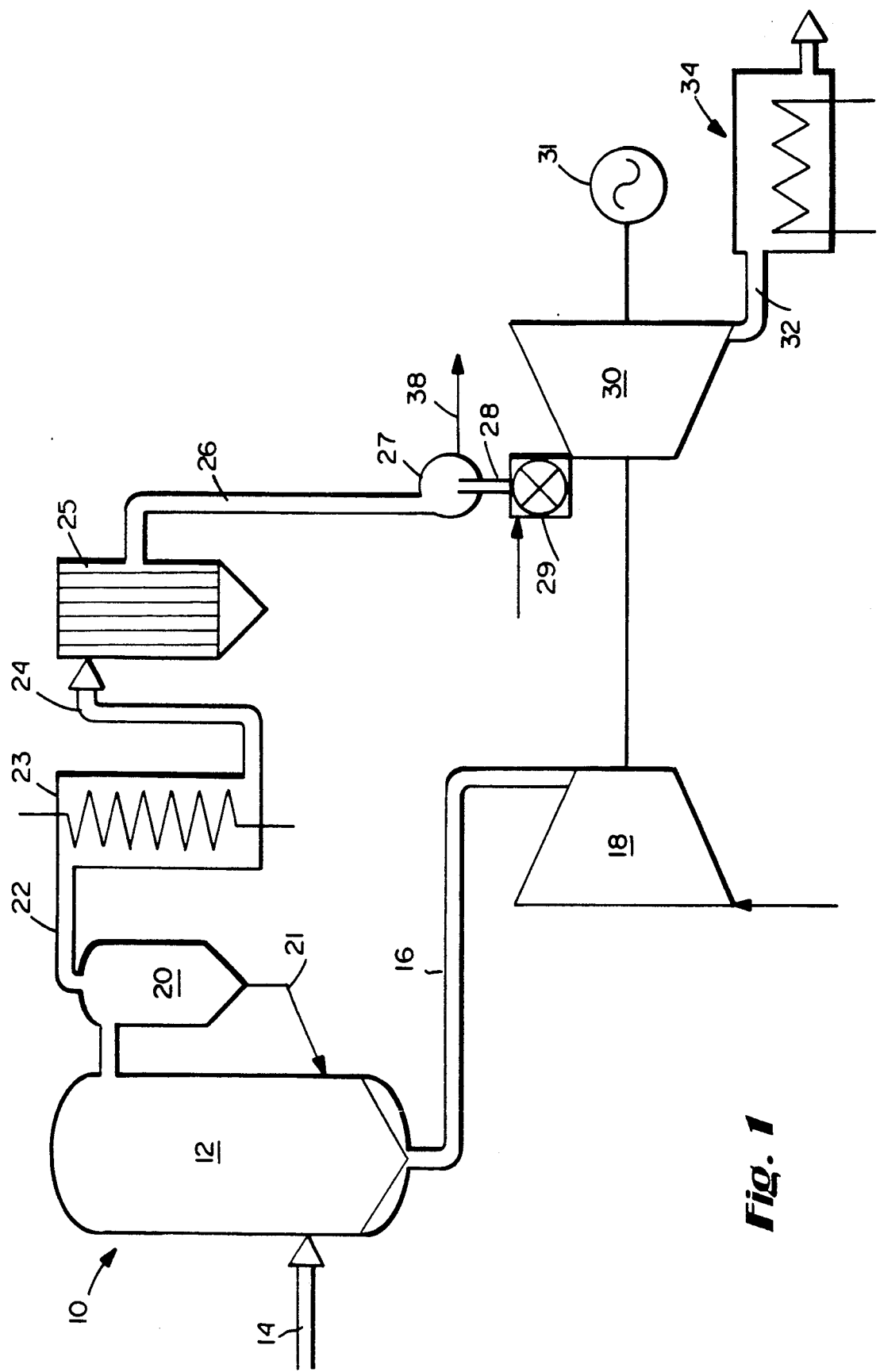
FIG. 1 is a schematic view of an exemplary assembly according to the present invention.

The assembly 10 according to the invention comprises a reactor chamber having a fuel inlet 14 and a compressed air inlet 16, compressed ambient air being provided by the compressor 18. Hot combustion gas is discharged from the chamber 12 pass in line 19 to a cyclone separator 20. The fuel in line 14, such as coal, peat, or the like, typically will produce a large number of particulates which must be removed by the separator 20, and the larger particles are returned to the chamber 12 via line 21. The cleaned gases from separator 20 pass in line 22 to a cooler in which the product gases (typically of greater than 800° C.) are significantly cooled (e.g. to about 150°-650° C., preferably 450°-650° C.). The components 20, 23 may be built right into the reactor chamber 12, as is known per se.

The cooled gases from cooler 23 pass in line 24 to a filter 25 or like particle separator, which separates out finer particles. The clean gas flows in conduit 26 to a cyclone 27, with the gas being discharged from cyclone 27 passing in conduit 28 to the combustion chamber 29 of the gas turbine 30. In the combustion chamber 29 the gas is typically heated to a temperature of greater than about 1000° C. Turbine 30 powers both the compressor 18 and the generator 31. The spent gas from the turbine 30 passes in line to waste heat boiler 34.

Cyclone 27 comprises means for concentrating particles greater than the undesirable predetermined size, and is associated with apparatus for detecting such particles. For the embodiment illustrated in FIGS. 1 and 2, the cyclone 27 is a horizontal cyclone having a main chamber 36, with an inlet 37 thereto connected to the conduit 26, and a particles outlet 38. The cyclone 27 preferably is lined with refractory material, or made of a refractory material, or may be of special heat resistant steel. Normally refractory material cannot be used in a turbine system since particles or chunks may come off and damage the turbine. However according to the invention any particles that are dislodged will merely be passed into the particles outlet 38, therefore a refractory may suitably be utilized as the material of construction of the horizontal cyclone 27.

Figure 2:
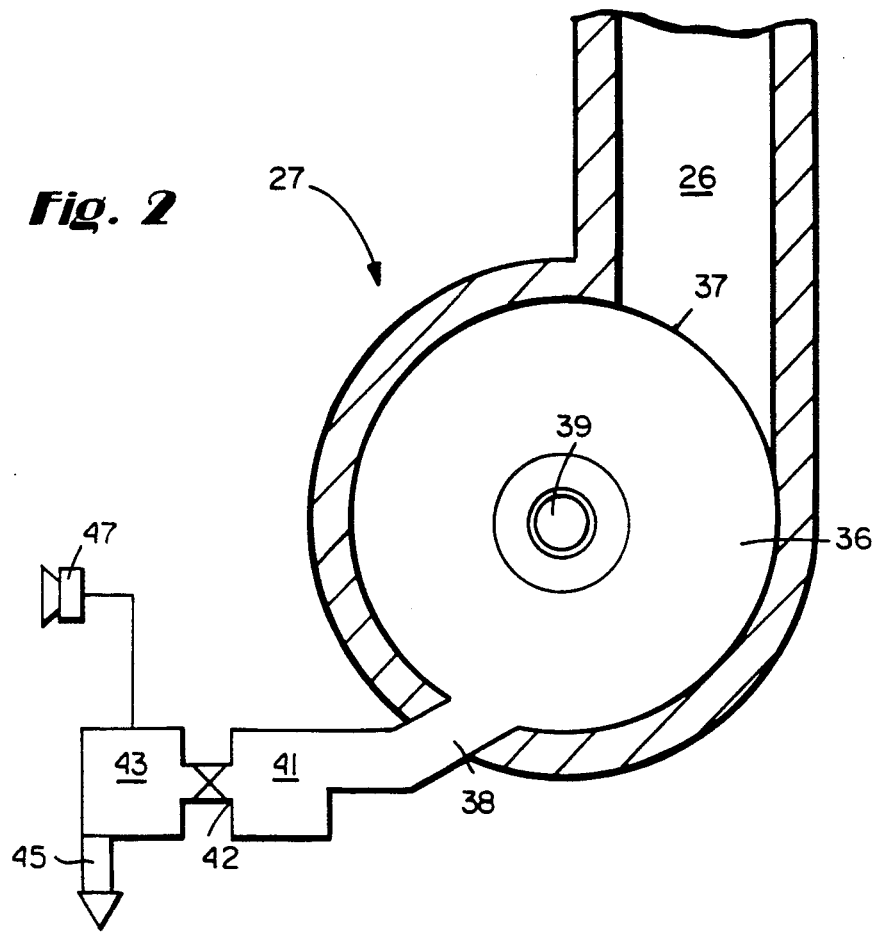
FIG. 2 is a vertical cross-sectional view of the exemplary cyclone in the assembly of FIG. 1.

For the particular cyclone 27 illustrated in FIG. 2, a burner 39 is arranged axially in the cyclone main chamber 36. By burning oil, or gas, this "topping" combustor increases the temperature of the gas being acted upon, before it is fed to the turbine 30.

Particles from the chamber 36 passing under the action of the centrifugal force therein pass from particles outlet conduit 38 to a particle trap 41. The trap 41 has an opening therein to allow a small gas flow to flow continuously or intermittently out through conduit 42 to a conventional measuring device 43 which measures the particle concentration or detects particles in this restricted gas flow, the gas ultimately passing out in line 45 from the measuring device 43. The measuring or detecting device 43—if it detects an undesirable concentration of particles greater than the predetermined size—initiates activities that prevent damage to the turbine 30. As illustrated in FIG. 2, this may be by activating the alarm 47, which is a horn. Alternatively other types of alarms, such as visual alarms, may be activated, or the process may be somehow modified to correct action or to alleviate the problem, e.g. by passing the gas in conduit 24 through an alternative or additional filter 25, by terminating the flow of fuel in line 14 to the chamber 12, by venting the gas in conduit 28, etc.

Figure 3:
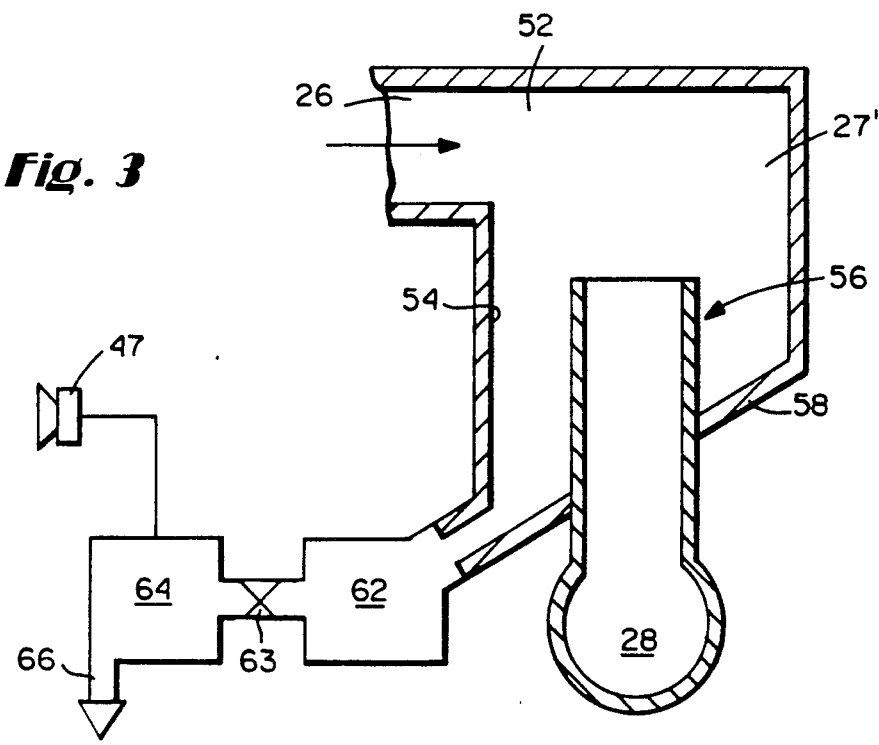
FIG. 3 is a view like that of FIG. 2 for a different embodiment of cyclone.

FIG. 3 shows an alternative form of cyclone 27', in this case the cyclone being a flow through cyclone. While the gas exit conduit 28 was not visible in FIG. 2, because of the construction of the flow through cyclone 27', the gas out flow conduit 28 is visible in the cross-sectional view of FIG. 3.

In the cyclone 27', gas is introduced tangentially into the vertically oriented cyclone 27' via inlet opening 52 in the upper part thereof. Particles will flow downwardly along the peripheral walls 54 of the cyclone 27', while clean gases will flow through the center pipe 56 into the gas discharge conduit 28. The particles separated from the gas will end up on the bottom 58 of the cyclone, and flow through particle discharge conduit 60 into the particle trap 50, connected by a conduit 63 to the measuring device 64, and discharge conduit 66. The structures 62 through 66 are identical or comparable to the structures 41 through 45 in the FIG. 2 embodiment.

Utilizing the apparatus heretofore described, it is apparent that according to the invention a method of preventing damage to a device for utilizing gases that is easily damaged by particles of greater than a predetermined size (which size of particles is difficult to detect in non-concentrated form) is provided. The method comprises the steps of essentially sequentially: (a) Effecting removal of particles greater than a predetermined size from the gas stream (utilizing cyclone separator 20 and filter 25). (b) Concentrating any particles greater than the predetermined size in the gas stream by subjecting the gas stream to cyclonic action in horizontal cyclone 27 or vertical flow through cyclone 27'. (c) Detecting the level of concentrated particles greater than the predetermined size, utilizing particle traps and detectors 41 through 45, or 62 through 66. And, (d) in response to step (c) initiating activities that prevent damage to the gas utilization device (turbine 30), for example by activating alarm 47 by the device 43, 64. Where the gas utilization device 30 is a gas turbine running on hot combustion gases, steps (a)-(c) are practiced to remove, concentrate, and detect particles having a size of about 10 micrometers or greater. Step (c) is practiced by trapping the particles in the particle discharge from the cyclone, and causing them to flow into a measuring device 43, 64.

It will thus be seen that according to the present invention an apparatus and method have been provided for effectively utilizing gases while preventing damage to the gas utilization device which is easily damaged by particles in the gases greater than a predetermined size. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for utilizing gases, comprising:
   (a) means for removing particles from gases in a gas stream;
   (b) means for utilizing the gases susceptible to damage from particles greater than a predetermined size remaining in the gases, said means comprises a turbine, and wherein said predetermined size is about 10 micrometers;
   (c) particle concentrating means for concentrating the number of particles above the predetermined size per unit of volume which are normally in a gas stream in an amount too small to be detected but nevertheless can cause damage to said means (b), said particle concentrating means disposed between said means (a) and (b), and immediately before said means (b);
   (d) particle detecting means associated with said particle concentrating means for detecting an undesirable level of particles above the predetermined size; and
   (e) means responsive to said means (d) initiating activity which prevents damage to said means (b) when an undesirable sudden change in the level of the particles is detected; and
   wherein said means (c) comprises a cyclone.

2. Apparatus as recited in claim 1 wherein said means (c) further comprises a horizontal cyclone.

3. Apparatus as recited in claim 1 wherein said means (e) comprises an alarm.

4. Apparatus as recited in claim 1 wherein said means (a) comprises a filter.

5. Apparatus for utilizing gases, comprising:

(a) means for removing particles from gases in a gas stream;

(b) means for utilizing the gases susceptible to damage from particles greater than a predetermined size remaining in the gases;

(c) particle concentrating means, comprising a cyclone, for concentrating the number of particles above the predetermined size per unit of volume which are normally in a gas stream in an amount too small to be detected but nevertheless can cause damage to said means (b), said particle concentrating means disposed between said means (a) and (b), and immediately before said means (b);

(d) particle detecting means associated with said particle concentrating means for detecting an undesirable level of particles above the predetermined size, said means comprising a particles discharge from said cyclone, a gas trap disposed in said particles discharge, and a detecting chamber operatively connected to said gas trap; and (e) means responsive to said means (d) initiating activity which prevents damage to said means (b) when an undesirable sudden change in the level of the particles is detected.

6. Apparatus for utilizing gases, comprising:

(a) means for removing particles from gases in a gas stream, with a source of hot combustion gases, connected to said means, said means disposed between the source of hot combustion gases and a particle concentrating means, said means comprising a filter, and further comprising gas cooling means disposed between said filter and the source of hot combustion gases;

(b) means for utilizing the gases susceptible to damage from particles greater than a predetermined size remaining in the gases;

(c) particle concentrating means, comprising a cyclone, for concentrating the number of particles above the predetermined size per unit of volume which are normally in a gas stream in an amount too small to be detected but nevertheless can cause damage to said means (b), said particle concentrating means disposed between said means (a) and (b), and immediately before said means (b);

(d) particle detecting means associated with said particle concentrating means for detecting an undesirable level of particles above the predetermined size; and (e) means responsive to said means (d) initiating activity which prevents damage to said means (b) when an undesirable sudden change in the level of the particles is detected.

7. An assembly for creating and using hot combustion gases, comprising:

means for combusting fuel to produce hot combustion gases having particles therein;

means for removing particles greater than a predetermined size from the hot combustion gases;

a conduit extending from said particle removing means;

a turbine operatively connected to said conduit;

a cyclone disposed in said conduit between said particles removing means and said turbine;

a particles discharge from said cyclone;

a particles trap disposed in said particles discharge; and particles detecting means operatively associated with said particle trap, for detecting the physical presence of particles greater than a predetermined size therein.

8. Apparatus for utilizing gases, comprising:

(a) means for removing particles from gases in a gas stream;

(b) a turbine for utilizing the gases susceptible to damage from particles a greater than a predetermined size of about 10 micrometers remaining in the gases;

(c) a cyclone comprising a particle concentrating means for concentrating the number of particles above the predetermined size per unit of volume, said particle concentrating means disposed between said means (a) and (b);

(d) particle detecting means associated with said particle concentrating means for detecting an undesirable level of particles above the predetermined size, and comprising a particles discharge from said cyclone, a gas trap disposed in said particles discharge, and a detecting chamber operatively connected to said gas trap; and (e) means responsive to said means (d) initiating activity which prevents damage to said means (b) when an undesirable level of the particles is detected.

9. Apparatus as recited in claim 8 wherein said means (c) further comprises a horizontal cyclone.

10. Apparatus as recited in claim 8 wherein said means (c) further comprises a flow through cyclone.

* * * * *